Aug. 15, 1967   B. J. McCOLL   3,335,810
POSITIVE TRACTION SYSTEM FOR VEHICLES
Filed March 1, 1966   5 Sheets-Sheet 1

INVENTOR
BRUCE J. McCOLL
BY- *Maybee & Legris*
ATTORNEYS

Aug. 15, 1967   B. J. McCOLL   3,335,810
POSITIVE TRACTION SYSTEM FOR VEHICLES
Filed March 1, 1966   5 Sheets-Sheet 2

INVENTOR
BRUCE J. McCOLL
BY~ Maybee & Legris
ATTORNEYS

Aug. 15, 1967     B. J. McCOLL     3,335,810
POSITIVE TRACTION SYSTEM FOR VEHICLES
Filed March 1, 1966     5 Sheets-Sheet 3

INVENTOR
BRUCE J. McCOLL
BY Maybee & Legris
ATTORNEYS

United States Patent Office 3,335,810
Patented Aug. 15, 1967

3,335,810
POSITIVE TRACTION SYSTEM FOR VEHICLES
Bruce J. McColl, Whitby, Ontario, Canada, assignor to
Owens-Illinois, Inc., a corporation of Ohio
Filed Mar. 1, 1966, Ser. No. 530,980
4 Claims. (Cl. 180—8)

This invention relates to articulated vehicles and more particularly to a vehicle propulsion system by means of which positive traction may be obtained for movement of the vehicle across terrain under conditions which would provide inadequate traction characteristics for conventional traction means.

This application is a continuation-in-part of my earlier United States patent application Serial No. 351,285, filed on March 12, 1964, and now abandoned.

Broadly speaking, within the context of this specification and in the appended claims, an articulated vehicle comprises two chassis sections which are pivoted or articulated together so that the two sections may pivot relative to one another in a horizontal plane about a vertical axis and so that they may usually have a limited freedom in roll relative to one another but, for the most part, have no freedom in pitch.

Vehicles of this type exhibit mobility characteristics well beyond those possible with more conventional chassis structures and steering systems such as a conventional solid chassis with an Ackerman type steering arrangement. Under high movement resistance conditions all land vehicles exhibit mobility characteristics which are limited primarily by traction and tracking characteristics of the running gear and by the configuration of the chassis relative to the running gear. A center frame articulated vehicle of the kind illustrated in connection with the preferred embodiment of the present invention provides for the perfect tracking of front and rear running gear elements and exhibits obvious advantages over other vehicles when under forward movement in a conventional manner.

When such a center frame articulated vehicle is moving through high resistance media with deteriorating traction characteristics, vehicle mobility depends to an increasing extent upon the traction characteristics of the driving elements. This characteristic may be increased to a limited extent in any vehicle configuration by providing a drive to all running gear elements in contact with the ground but when movement resistance equals or exceeds the tractive effort which can be developed by all of the driving elements in contact with the supporting media, the vehicle becomes immobilized. At this point, the center frame articulated vehicle exhibits a further advantage in that the two chassis sections may be articulated relative to one another without forward movement of the vehicle relative to the ground and, through this articulation, the driving elements may search out improved traction conditions with the area of running gear movement permitted by vehicle articulation.

When articulated vehicles become immobilized by conditions which do not provide satisfastory traction within the range of articulation of the chassis sections, mobility can be only restored through some form of external assistance. Such external assistance is frequently difficult to achieve and always time-consuming and expensive. However, it is desirable in both industrial and military vehicle applications, to extend the range of mobility for vehicles which must travel over media and grades beyond those possible even with articulated vehicles of conventional design.

Accordingly, it is a primary object of the present invention to provide a system by means of which positive traction assistance may be obtained so that the range of mobility of an articulated vehicle may be extended.

The present invention will be described in detail with reference to the accompanying drawings in which like parts are denoted by like reference numerals in the various views in which.

Figure 1:
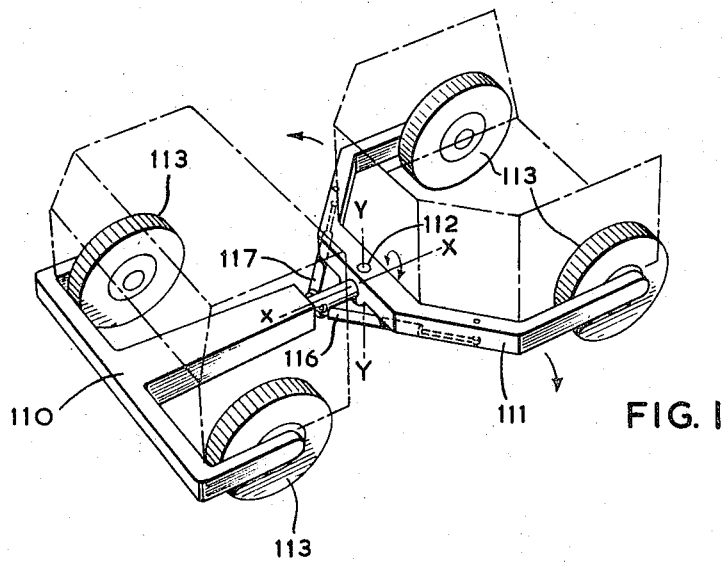
FIGURE 1 is a diagrammatic perspective view of a center frame articulated vehicle representing a practical embodiment of the present invention.

FIGURE 1 of the drawings illustrates diagrammatically a vehicle comprising a front chassis 110 and a rear chassis 111 which are pivoted together at an articulation point 112. Each of the chassis 110 and 111 is provided with support means in the form of wheels 113 and hydraulic cylinders 116 and 117 are associated with the articulation point 112 to control the articulation of chassis 110 and 111 relative to one another to provide for steerage of the vehicle. As can be seen from FIGURE 1, the two chassis are provided for limited freedom in roll about axis X—X and for articulation in a horizontal plane about the vertical axis Y—Y but are restrained from any freedom in pitch so that the vehicle is stable and self-supporting in the position and condition shown in FIGURE 2. It is, of course, not necessary to provide restraint to freedom in pitch if fore and aft chassis sections are provided with running gear having fore and aft stability such as tracked running gear.

Figure 7:
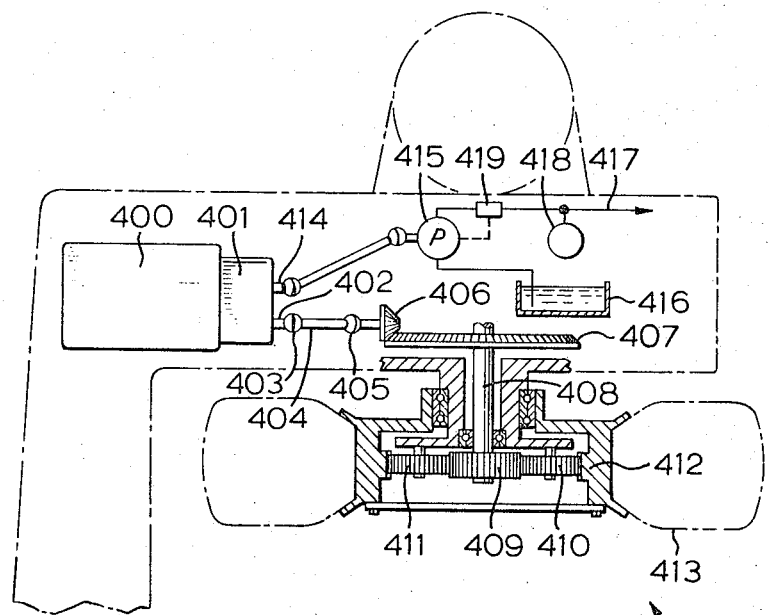
FIGURE 7 is a schematic view of a prime mover and its mechanical and hydraulic power train at one wheel station on the vehicle.

In a preferred embodiment of the invention, each wheel station 113a will be provided with its own prime mover 400 as seen in FIGURE 7. The prime mover 400, preferably a diesel engine is coupled to a transmission 401 which, through output shaft 402, universal joint 403, drive shaft 404, a second universal joint 405, drives a pinion 406 which, in turn, drives a bevel gear 407. Gear 407, through shaft 408 drives a sun gear 409 which, through planetry gears 410, drives an annular gear 411 which may be an integral part of the rim 412 to which the tire 413 is mounted. The speed reduction which is obtained in this way is sufficient to provide very substantial torque at wheel 413.

A second output shaft 414 associated with the transmission 401 drives a hydraulic pump 415 through appropriate shafts and universal joints. The pump 415 draws hydraulic fluid from a reservoir 416 and supplies it under pressure to delivery line 417. Appropriate accumulators 418 and pressure release valves, check valves and the like may be provided as schematically illustrated at 419.

In the preferred embodiment, the transmission 401 will, in association with output shaft 402, embody power shift mechanism which will provide for two speeds forward and two speeds reverse. Output shaft 414 will be unaffected by the power shift mechanism and will constantly provide power to hydraulic pump 415 so that this pump may deliver hydraulic fluid under pressure to the system which will be subsequently described in greater detail.

Suitable superstructure such as that illustrated in phantom in FIGURE 1 may be provided on both chassis and this superstructure may house the prime movers, the driveline systems, the operator's cab and may, in addition, provide facilities and equipment which will specially relate to the function to which the vehicle is intended to perform.

The vehicle illustrated in FIGURE 1 is capable of locomotion in an entirely conventional fashion by means of the drive provided to each of the wheels through the transmission and speed reduction gearing which has been outlined above. Locomotion in this fashion, however, will result in immobilization of the vehicle under traction conditions which provide resistance to movement greater than can be overcome by the tractive efforts supplied by the running gear.

Under such conditions, the ability of the present vehicle to move is substantially enhanced by the present invention which, in each of its various embodiments, will be described in greater detail below. However, before proceeding to such a detailed description of the application of the invention to a specific vehicle such as that illustrated in FIGURE 1, a more general discussion of the principles of the vehicle propulsion system may be of assistance.

A ready understanding of the manner in which the present vehicle may move under unfavourable traction conditions may be obtained by considering the manner in which it is possible for a man to move along the ground while lying prone, using only his elbows and assuming that his legs are immobilized. Under these conditions, a man is analogous to an articulated vehicle having a forward traction chassis and a rear stabilizer chassis, the traction chassis being constituted by the man's torso and elbows and the stabilizer chassis being constituted by his immobilized legs. In order to move forward under these conditions a man will place one elbow upon the ground so as to fix himself to the ground at that point and will then articulate his body at the waist so as to cause the other elbow to move forwardly in an arc, the center of which is constituted by the point of contact between the first elbow and the ground. The raised elbow will move forwardly in this arc because his legs offer sufficiently great resistance to sideways movement. Forward movement may be continued in this fashion by advancing one elbow ahead of the other alternately and this advance can be achieved solely by the articulation of the body at the waist and is not dependent upon independent advance of the arms.

In order to achieve movement in this way, it is merely necessary that the sideways resistance to movement of the person's legs be greater than the resistance to forward movement of the raised elbows, and upper torso weight is either shifted from elbow to elbow or allowed to slide along the ground.

If this analogy is now directed at a vehicle of the kind illustrated in FIGURE 1, it will be apparent that this vehicle is capable of locomotion in a manner identical to that which has been described in general terms above. The chassis section 110 may be considered as the traction chassis or traction section and the chassis 111 may be considered as the stabilizer section comparable to the man's legs. In place of the elbows of the man advancing in this fashion, the vehicle is provided with means to selectively fix one of at least two points on opposite sides of the traction section relative to the ground and, traction section weight being carried by the wheels, these means may be constituted by three variations or embodiments of the present invention as will be described.

The simplest and most economical system for achieving engagement with the ground in the manner contemplated by the invention is to simply apply a brake to one or the other of the two wheels of the traction station 110 so that the other wheel may move in an arc about the braked and locked wheel. This system will be most effective when the wheels are equipped with aggressive ground contact means such as grouser type treads. It is this system or method which is contemplated in FIGURES 2 and 3 and in these figures the braked wheel is indicated by the presence of a dot in the center of the outline indicating the wheel. Thus, in FIGURE 2a, it is the left-hand wheel 113 on the traction section 110 which is braked and the right-hand wheel 113 is free to rotate and may be powered or not as the case may be. It is evident of course that the addition of power to the wheels, which are not braked, will add to the mobility of the vehicle under most traction conditions.

Figures 2A, 2B, 2C:
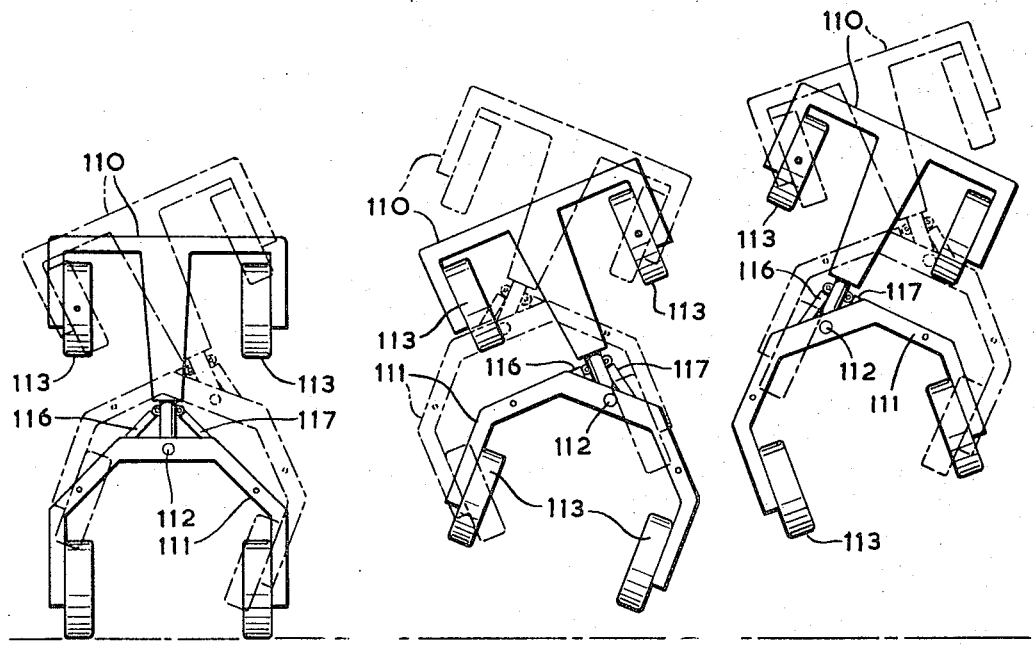
FIGURES 2a, 2b and 2c are diagrammatic views showing the sequential steps in the operation of the propulsion system for a vehicle of the kind illustrated in FIGURE 1.

Considering the sequence of diagrams constituting FIGURES 2a, 2b and 2c, the vehicle may be considered to start from the solid line position in FIGURE 2a where the four wheels 113 lie upon the four corners of a rectangle. The left-hand wheel of the traction section 110 is braked and the hydraulic cylinders 116 and 117 are actuated so that cylinder 116 is retracted while cylinder 117 is extended so that the vehicle moves to assume the dotted line position of FIGURE 2a. The solid line position of FIGURE 2b is identical to the dotted line position o FIGURE 2a and in this position, the opposite wheel 113 of the traction section 110 is braked as is indicated by the dot and the operation of the hydraulic cylinders is reversed so that cylinder 117 is retracted and cylinder 116 is extended.

At the end of this cycle the vehicle will occupy the dotted line position of FIGURE 2b. The solid line position of FIGURE 2c is identical to the dotted line position of FIGURE 2b and the braked wheel has again become the left-hand wheel 113 and the cycle is repeated.

From a consideration of FIGURES 2a, 2b and 2c it will become apparent that the vehicle has advanced in a "forward" direction if the traction section 110 is considered to be the "front" of the vehicle and it will become apparent that this forward movement can be continued under these conditions.

Figure 3A:
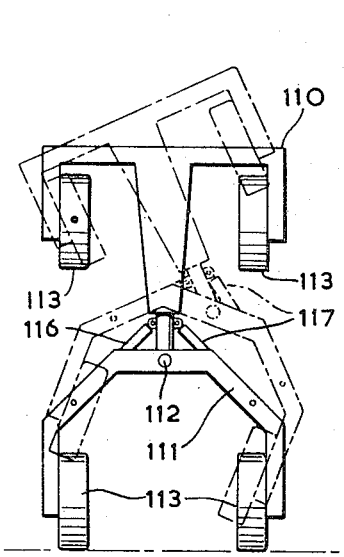
FIGURES 3a, 3b, 3c and 3d are diagrammatic views showing the sequential steps in the operation of the propulsion system for the vehicle to travel in a curved path.
Figure 3B:
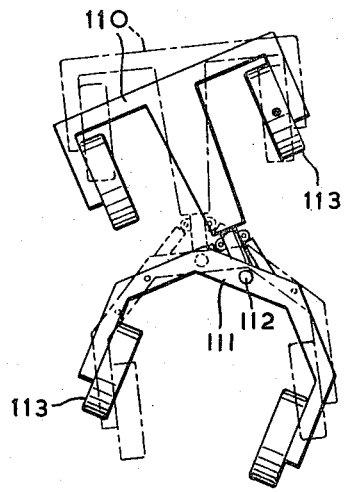
Figure 3C:
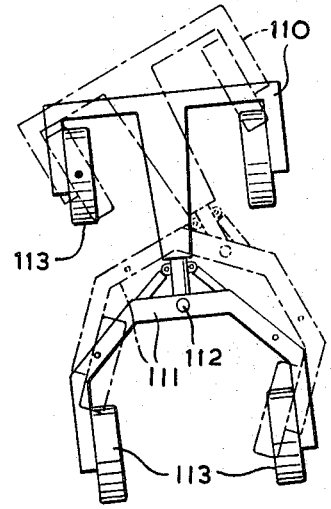
Figure 3D:
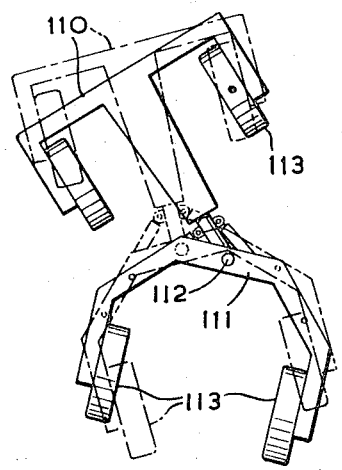

A consideration of FIGURES 3a, 3b, 3c and 3d will make it apparent that the vehicle, propelling itself in the manner described with reference to FIGURE 2, can also traverse a curved path. The sequence of movement described with reference to FIGURE 2 provided for an equal articulation on both sides of a longitudinal center line so that the vehicle described a given angle of articulation, first to the left and then, through the same angle of articulation, to the right. With respect to FIGURE 3, however, the vehicle in FIGURE 3a is first describing a predetermined angle of articulation to the left with the left-front wheel being braked. In FIGURE 3b, the right front wheel is braked and the vehicle is describing an angle of articulation to the right which is of a lesser extent than the angle of articulation to the left which has just been described. In FIGURE 3c, the left front wheel is being braked and the vehicle is describing a greater angle of articulation to the left than it has just described to the right in FIGURE 3b. Finally, in FIGURE 3d, the right front wheel is being braked and the vehicle is describing again a smaller angle of articulation to the right than has just been described to the left as illustrated in FIGURE 3c. Thus, the difference between the angle of articulation to the left and the angle of articulation to the right becomes cumulative through successive cycles and the vehicle gradually describes an arc to the left the radius of which will be greater or lesser depending upon the amount of difference between the left and right-hand angles of articulation between successive cycles.

The vehicle just described is capable of mobility in terrain which would immoblize a vehicle relying for its tractive effort solely upon the operation of the ground engaging wheels 113 driven by a prime mover through a suitable transmission system. It is to be remembered that the propulsion system which is being described, while it may be a total substitute for the conventional propulsion system derived from powered wheels would normally be used as a useful adjunct thereto.

However, the efficiency of the vehicle and the system which has been described with reference to FIGURES 2 and 3 is limited, at least to some extent, by the tractive characteristics of the supporting means or wheels 113. Conceivably, the conditions of terrain over which the vehicle is travelling may be such that the braking of a wheel will not constitute a firm anchor for that wheel relative to the ground and the subsequent articulation of the vehicle may cause relative sliding movement between the braked wheel and the ground to the detriment of the overall function of the propulsion system. Accordingly, in FIGURE 4 a system is proposed by means of which the security of the engagement between the wheel and the ground may be increased. This is achieved by the provision of an arm 225 which may be pivoted about the axis of rotation of each wheel 213 carried by the traction section or chassis 210. In other respects, the remainder of the vehicle is similar to that described with reference to FIGURE 1 and comprises a rear chassis section 211 carrying wheels 213 and pivoted to the front chassis section 210 by an articulation point 212 which is powered by means of hydraulic cylinders 216 and 217.

Figure 4:
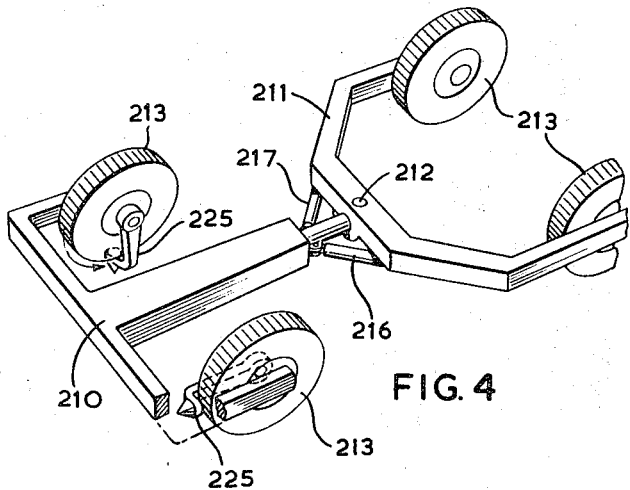
FIGURE 4 is a diagrammatic view in perspective illustrating a modified form of the vehicle of FIGURE 2.
Figure 4A:
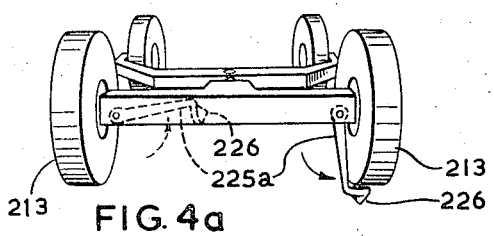
FIGURE 4a is a diagrammatic view showing a modified form of the vehicle of FIGURE 4.

An alternative to the construction of FIGURE 4 is shown in FIGURE 4a where the arms 225, instead of being pivoted about the axes of rotation of the wheels 213 are pivoted about axes at right angles thereto but adjacent the wheels 213. These arms 225a are illustrated in FIGURE 4a.

The function of the arrangement shown in FIGURES 4 and 4a will be immediately apparent.

Instead of, or in addition to braking the relevant wheels 213, the arm 225 or 225a associated with that wheel will be actuated to move from the dotted line position shown, for example, in FIGURE 4a to the solid line position shown in FIGURE 4a, the arm 225a being provided with a spike or a spade 226 to engage the ground and assist the wheel 213 in fixing itself relative to the ground to act as a pivot point about which the chassis section may move during articulation of the vehicle as a whole.

The drawings have not illustrated any detailed hardware by means of which the arms 225 or 225a may be actuated but it will be apparent to those skilled in the mechanical arts that a system of hydraulic jacks or other powered means may be used for this purpose. It will also be apparent that the ground engaging means may be swivel mounted to minimize ground disturbance and thus maximize resistance to pivot movement.

Figure 5:
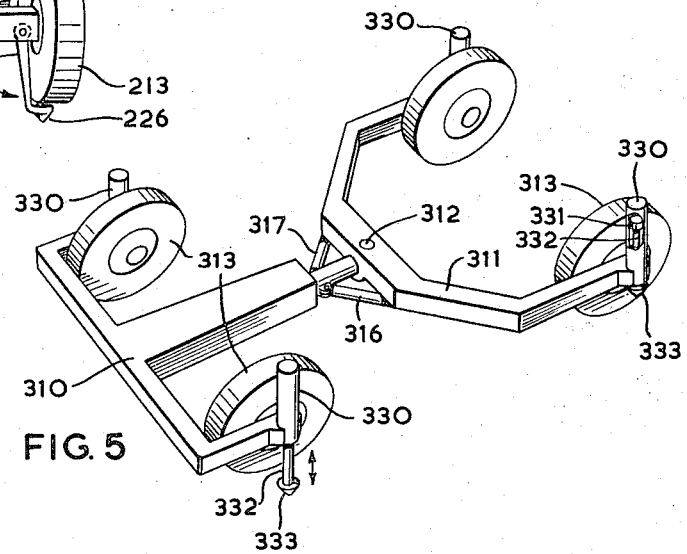
FIGURE 5 is a diagrammatic view showing the preferred embodiment of the invention.

Although the various forms which the invention may take and which have been illustrated in FIGURES 1, 4 and 4a are all practical and functional variations of the basic idea, the preferred embodiment of the invention is illustrated in FIGURE 5 as applied to a general vehicle configuration which is the same as that illustrated with respect to FIGURES 1 and 4. In this respect it comprises a front chassis or traction section 310 carrying wheels 313 and pivoted to a rear chassis section 311 at an articulation point 312. The rear chassis section 311 also carries wheels 313 and a pair of hydraulic cylinders 316 and 317 are provided to function in a manner which has already been described.

This preferred embodiment of the invention provides ground engaging means which may, for example, comprise hydraulic cylinders 330 within which are reciprocably mounted pistons 331 carrying piston rods 332 which, at their lower ends, are provided with ground engaging elements 333. Each wheel 313 in both chassis sections has such a ground engaging means associated therewith and each of these ground engaging means 330 is controllably and selectively operable through a power system which will be powered by a suitable prime mover carried by the vehicle chassis. Although the vehicle illustrated in FIGURE 5 is provided with ground engaging means 330 associated with each wheel 313 of each chassis, under normal conditions only the ground engaging means of one chassis will be used for the propulsion of the vehicle.

Figures 6A, 6B, 6C:
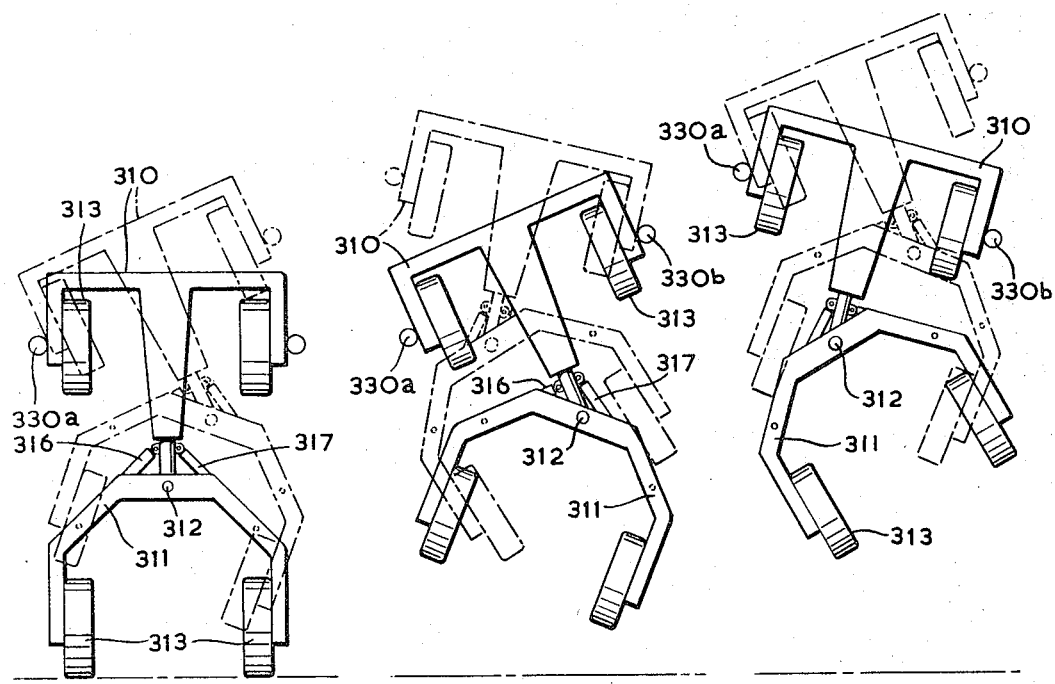
FIGURES 6a, 6b and 6c are diagrammatic views showing the sequential steps in the operation of the propulsion system of the vehicle of FIGURE 5.

The function of the propulsion system embodied in the vehicle of FIGURE 5 may be seen from a consideration of FIGURES 6a, 6b and 6c. In FIGURE 6a the vehicle may be considered to be at rest in the solid line position. To commence its travel, hydraulic fluid is admitted to the upper end of hydraulic cylinder 330a associated with the left-hand wheel 313 (as seen in FIGURE 6a) into the ground to drive element 333 and hydraulic cylinder 316 will be retracted and hydraulic cylinder 317 will be extended until the vehicle occupies the position shown in dotted lines in FIGURE 6a. The solid line position of FIGURE 6b is identical to the dotted line position of FIGURE 6a and once the vehicle has achieved this position, hydraulic fluid will be admitted to the lower end of cylinder 330a to retract element 333 and fluid will be admitted to the upper end of cylinder 330b associated with the right-hand wheel 313 of chassis 310 and hydraulic cylinder 316 will be extended and hydraulic cylinder 317 will be retracted until the vehicle occupies the position shown in dotted lines in FIGURE 6b. The solid line position of FIGURE 6c is identical to the dotted line position of FIGURE 6b and when the vehicle has achieved this position, the cycle of FIGURE 6a is repeated with the left-hand ground engaging element associated with the left-hand wheel 313 becoming operative and the right-hand ground engaging element becoming inoperative, having been retracted, so that the vehicle may articulate about its articulation point 312 in a manner which has, by now, become clear.

The system of propulsion which has been described with reference to FIGURES 5 and 6 may be conveniently termed the "pivot-walk system" and, as has already been described, would normally be applied to both the front and rear sections of an articulated vehicle. In use, either the front or the rear section pivots will be selected depending upon the condition of the supporting media adjacent to each section. Failure to move the vehicle through the use of front section pivots might be overcome by switching to rear section pivots and vice versa. For example, considering the condition of FIGURE 6b, if it were impossible to move the vehicle from the solid line position of FIGURE 6b to the solid line position of FIGURE 6c by virtue of the fact that the right-hand ground engaging element associated with the right-hand wheel 313 did not meet with firm support, substantially the same effect could be achieved by actuating the ground engaging element associated with the rear left wheel 313 carried by the chassis 311. The actuation of the hydraulic cylinders 316 and 317 would remain unchanged.

Another advantageous feature associated with the embodiment of FIGURE 5 is the ability of the vehicle to stabilize itself upon a grade which would be unsafe as a consequence of marginal traction or unstable as a consequence of gradient for a vehicle without these provisions.

In FIGURE 5 the hydraulic cylinder 330 and the piston rod 332 and the ground engaging element 333 are shown as being closely associated with each of the wheels 313. The exact position of these elements relative to the wheels 313 in a transverse direction is not particularly critical and they may be located either inboard or outboard of the wheels and either closer to or further away from the wheels than has been illustrated. It is important, however, that they act in a vertical direction through the axis of rotation of the wheel in the case of a wheeled vehicle and through the center of support in the case of a supporting element other than a wheel. The efficiency of the system is increased if these ground engaging elements lie outboard of the wheel 313 and, within certain practical limits, the greater the distance between opposite ground engaging elements, the greater the efficiency of the "pivot-walk" function.

As was described with reference to FIGURE 7, each wheel station 113a embodies its own prime mover, mechanical transmission and hydraulic pressure supply system. Each of the four hydraulic pressure supply systems feeds hydraulic fluid under pressure to a main pressure manifold from which hydraulic fluid is drawn and controlled by appropriate valves and conduits to perform the numerous vehicle functions.

Figure 8:
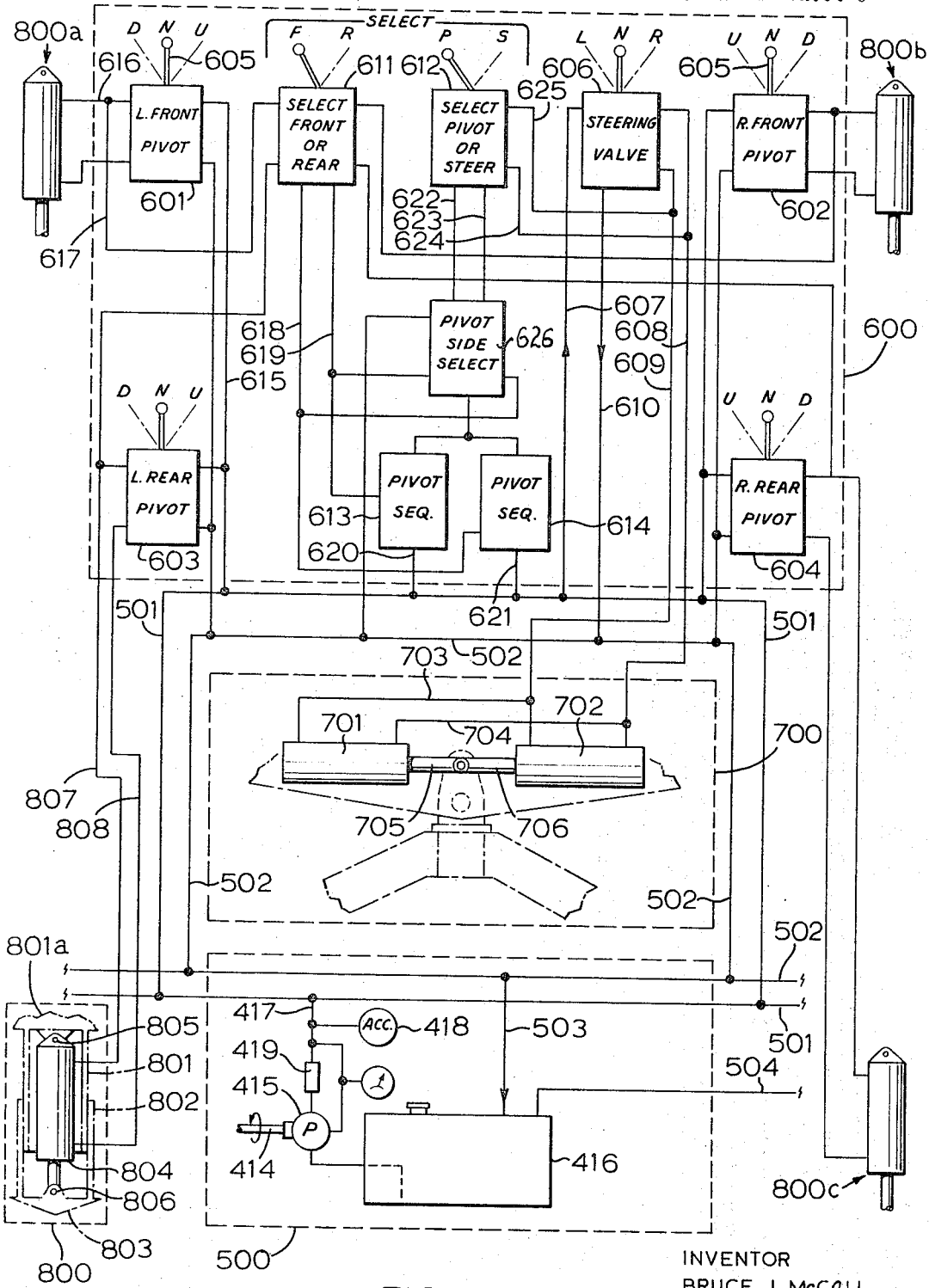
FIGURE 8 is a schematic diagram of a hydraulic system for the operation of the "pivot-walk" system of vehicle locomotion.

A system suitable for providing the functions necessary for the operation of the "pivot-walking" vehicle of FIGURES 5 and 6 is shown schematically in FIGURE 8. The hydraulic system of FIGURE 8 is best described by referring to its component sub-systems which may be enumerated as follows:

(1) The power supply subsystem enclosed in the block labelled 500.

(2) The control subsystem enclosed in the block labelled 600.

(3) The center frame articulation subsystem enclosed in the block labelled 700.

(4) The four pivot cylinder subsystems one of which is enclosed in the block labelled 800 and the remainder of which are generally indicated in less detail at 800a, 800b and 800c.

In order to obtain an adequate understanding of the hydraulic system, it is believed unnecessary to describe every component in exhaustive detail. Indeed, the following description will be essentially confined to describing the subsystems identified in paragraphs 1, 3 and 4 above as to both construction and function and the control subsystem will then be described by means of a discussion of its operation to perform the vehicle function.

*The power supply subsystem 500*

Each wheel station 113a, as shown in FIGURE 7 is provided with its own prime mover and hydraulic pressure supply system and, as seen in block 500 in FIGURE 8, there will be therefore four engine drive shafts 414 driving four hydraulic pumps 415 which draw hydraulic fluid from four reservoirs 416. Each pump 415 delivers hydraulic fluid under pressure through check valve 419 to line 417 which is provided with an appropriate accumulator 418. The lines 417 deliver fluid to the main pressure manifold 501 from which fluid may be drawn and delivered to the various valves of the control system 600 and the actuating cylinders of the center frame articulation system 700 and the pivot cylinder systems 800. Return hydraulic fluid is delivered to a return manifold 502 from which the fluid is returned to the reservoir 416 through line 503. The fluid levels in the four reservoirs are balanced through line 504.

The supply capability of the four prime movers and hydraulic pumps 415 is such that any two are capable of providing sufficient power for the operation of the vehicle.

*Center frame articulation subsystem 700*

The center frame articulation subsystem, as a part of the overall hydraulic system of the vehicle, embodies only the two large steering cylinders which bear reference numerals 701 and 702 in FIGURE 8 and which bear reference numerals 116 and 117 in FIGURE 1. Cylinder 701 is interconnected with cylinder 702 by means of hydraulic lines 703 and 704 so that as hydraulic fluid is admitted to line 703, the piston rod 705 will move out of cylinder 701 and piston rod 706 will move into cylinder 702. The manner in which cylinder 701 and 702 are able to steer or articulate the vehicle has already been described with reference to FIGURES 1 to 6 inclusive.

*The pivot cylinder subsystem 800*

In FIGURE 5 the pivot cylinders 330 have been schematically illustrated as simply comprising a downwardly opening cylinder within which is provided a piston having a piston rod 332 which may be driven downwardly so that its foot 333 may be engaged with the ground. In actual practice, of course, a construction of that kind would be incapable of sustaining the side loading to which such a device would be subjected under normal vehicle operation. Accordingly, as illustrated in FIGURE 8, the normal practice would be to construct the pivot cylinder from two telescoping sleeve-like elements the upper one of which, identified by reference numeral 801 is firmly fixed to the vehicle chassis structure a portion of which is illustrated at 801a. A lower sleeve 802 telescopes with sleeve 801 and may either lie outside sleeve 801 as shown or, equally conveniently, may lie within sleeve 801. Sleeve 802, at its lower end, is provided with the ground engaging foot 803 and the actuating cylinder 804 is located within the space enclosed by the two telescoping sleeves 801 and 802. In order to protect the cylinder from damage due to side loading, it will be pivotally mounted to the standing or fixed structure of the chassis at 805 and pivotally mounted to the lower cylinder and foot 802 and 803 by a pivot joint 806. Hydraulic lines 807 and 808 supply fluid to and return fluid from the pivot cylinder sub-system under the control of the valves in the control subsystem 600.

*The control subsystem 600*

In order to understand the function of the control system, a description of its operation will, it is believed, be adequate.

To begin with, it is to be noted that across the top of the block labelled 600 are provided a plurality of valves having manual lever-type controls. In addition, in the lower left-hand corner of block 600 and in the lower right-hand corner of block 600 are two further manually operated valves.

Valves 601, 602, 603 and 604, as their legends indicate, actuate respectively the left front pivot cylinder, the right front pivot cylinder, the left rear pivot cylinder and the right rear pivot cylinder. These valves are of the spring loaded self-centering type and, as can be seen from the legends applied to FIGURE 8, movement of the operating lever 605 of valve 601 to the left will result in the downward movement of the pivot cylinder sub-system associated with the left front wheel. Movement of handle 605 to the right will cause the upward movement of this cylinder and if the handle 605 is released, it will be spring centered in the neutral position to hold the cylinder in any given position.

Valve 606 constitutes the steering valve which actuates the center frame articulation cylinders 701 and 702. Valve 606 receives high pressure hydraulic fluid from main manifold 501 through line 607 and delivers it through either line 608 or 609 to one end or the other of cylinder 701 in order to effect actuation of these steering cylinders as may be readily understood. Return fluid is delivered to the return manifold through line 610.

As a matter of convenience, the lever controls 605 of valves 601 and 602 will be associated physically immediately adjacent one another so that they can be grasped together by one hand of the operator. It is to be noted that movement of lever 605 to the left on valve 601 produces a downward movement of the left front pivot cylinder whereas movement in the same direction in valve 602 produces upward movement of the pivot cylinder associated with the right front wheel of the vehicle. This is necessary for the function of the vehicle as has been previously described since it is imperative that only one of the pivot cylinders engage the ground during the "walking" sequence. Similar remarks would apply to the control levers of valves 603 and 604.

In addition to the valves already described, the control system includes valves 611 and 612. These are selector valves and their operation determines the function which the vehicle will perform. Consider first valve 611. This selector valve determines whether it is the front chassis or the rear chassis which will act as the traction chassis for the walking function of the vehicle. If the control lever of valve 611 is moved to the left as indicated in FIGURE 8, the selection will be for the front chassis to act as the traction chassis and the automatic sequencing valves will then proceed to sequence the operation on the basis of front chassis operation. Alternatively, movement of the control lever of valve 611 to the right will set the system to function on the basis of rear chassis operation.

This is achieved as follows for front chassis operation.

The control system 600 also includes pilot operated pivot sequencing valves 613 and 614. These valves are spring loaded to the closed position and remain closed under normal circumstances. When, however, the valve is subjected to sufficient hydraulic pressure, it will open to permit flow. Consider, for example, the situation when valve 601 has been actuated to lower the pivot for the left front pivot cylinder 800a. Movement of the valve lever 605 to the left into the D or down position will deliver high pressure fluid from the pressure manifold 501 through line 615, through valve 601, to line 616 and thence to the upper end of the hydraulic cylinder. As long as the movement of the piston in the cylinder in the downward direction meets no more than average or normal resistance or no resistance at all, the pressure in line 616 will remain below a certain level. However, as soon as the piston meets firm resistance such as solid ground which will provide an adequate footing for the vehicle, the pressure in line 616 will rise and this higher pressure will be fed to one of the pivot sequencing valves 613 and 614 through line 617, selector valve 611 and one of lines 618 and 619. The pressure will be sent through line 618 or 619 depending upon the position of selector valve 611. The increase in pressure at sequencing valve 613 or 614 will open this valve and will allow fluid from the main pressure manifold 501 to flow through the valves through one of lines 620 or 621 into the pivot side selector valve and thence through lines 622 or 623 to selector valve 612 from where it will proceed through lines 624 or 625 to one or the other of the steering cylinders in the center frame articulation subsystem 700. This condition applies if the selector valve 612 has been set in the P or pivot condition and, under these circumstances, the automatic cycling of the system is achieved so that as soon as cylinder 800a has achieved a firm footing the system will, through the sequencing valves and selector valves automatically actuate the steering cylinders to articulate the vehicle and advance it in the manner which has been described in detail with reference to the preceding figures.

In the event that it is desired to place the vehicle operation under manual rather than automatic sequencing control, valve 612 is actuated to place it in the S or steer condition, and under these circumstances, the pivot cylinder systems 800 are isolated from the steering cylinder circuit and the pivot cylinder circuit under the control of valves 601, 602, 603 and 604 are operated as a separate, nonsequencing system and the pivot cylinders may be placed up or down individually or all together as may be desired for wheel station elevation, vehicle stabilizing or the like. Operation of the vehicle under conditions in which the steering cylinders would be actuated would require, of course, that at least all but one of the cylinders 800 be in the raised or U position.

It is believed that the construction and operation of the hydraulic systems described above will, with the assistance of the accompanying drawings be understandable to one skilled in the art.

From the detailed description of the embodiments of the invention, it is believed apparent that a positive traction system for the propulsion of articulated vehicles has been disclosed which will enable vehicles of this kind to achieve mobility under conditions of supporting media and traction which would immobilize vehicles of conventional propulsion systems, and safe operation on grades considerably greater than those possible with conventional vehicles. It is also to be noted that although the invention has been described with reference to a practical form of vehicle chassis configuration, no limitation upon the scope of the invention is intended by this disclosure. In essence, it is essential only for the ground traversing vehicle to comprise a pair of chassis sections pivoted together at a joint for limited relative rotation in a horizontal plane about a vertical axis, support means to maintain the vehicle upon the ground to be traversed and means to selectively fix one of at least two points on opposite sides of at least one chassis section relative to the ground to be traversed and means to articulate the chassis sections about their articulation point for the other of said two points to move in an arc about the said one point.

The scope of the invention is to be defined in the appended claims.

What I claim as my invention is:

1. A ground traversing vehicle comprising a first front chassis section and a second rear chassis section pivoted together at a center joint for limited relative rotation in a horizontal plane about a vertical axis and for limited relative rotation about a longitudinally aligned horizontal axis but restrained against relative rotation about a transverse horizontal axis, wheels carried by each chassis section and mounted for rotation about axes transverse to the longitudinally aligned horizontal axis to maintain the vehicle upon the ground to be traversed, means associated with at least one chassis section and comprising an element having a ground engaging portion which is vertically movable into and out of engagement with the ground through the axis of the adjacent wheel carried by the chassis section to selectively fix one of at least two points equally spaced from the longitudinally aligned horizontal axis and equally spaced from the center joint on opposite sides of the said at least one chassis section relative to the ground to be traversed, and means to articulate the vehicle about its center joint for the other of said two points to move in an arc about the said one point.

2. A ground traversing vehicle comprising a first front chassis section and a second rear chassis section pivoted together at a center joint for limited relative rotation in a horizontal plane about a vertical axis and for limited relative rotation about a longitudinally aligned horizontal axis but restrained against relative rotation about a transverse horizontal axis, wheels carried by each chassis section and mounted for rotation about axes transverse to the longitudinally aligned horizontal axis to maintain the vehicle upon the ground to be traversed, means to selectively fix one of at least two points each associated with a wheel and on opposite sides of at least one chassis section relative to the ground to be traversed, said means comprising an element having a ground engaging portion which is vertically movable into and out of engagement with the ground through the axis of the adjacent wheel carried by the chassis section and means to articulate the vehicle about its center joint for the other of said two points to move in an arc about the said one point.

3. A ground traversing vehicle comprising a first front chassis section and a second rear chassis section pivoted together at a center joint for limited relative rotation in a horizontal plane about a vertical axis and for limited relative rotation about a longitudinally aligned horizontal axis but restrained against relative rotation about a transverse horizontal axis, two ground engaging wheels carried by each chassis section and mounted for rotation at opposite ends of axes transverse to the longitudinally aligned horizontal axis to maintain the vehicle upon the ground to be traversed, a prime mover associated with each wheel, means to transmit torque from the prime mover to its associated wheel, means to transmit power from the prime mover to a hydraulic pump delivering hydraulic fluid under pressure to a main hydraulic pressure manifold, means to selectively fix one of at least two points each associated with a wheel and on opposite sides of at least one chassis section relative to the ground to be traversed, said means comprising an hydraulically operable element receiving hydraulic fluid from said main pressure manifold, said element having a ground engaging portion which is vertically movable into and out of engagement with the ground through the axis of the adjacent wheel carried by the chassis section, hydraulically operable means supplied with hydraulic fluid from the main pressure manifold to articulate the vehicle about its center joint for the other of said points to move in an arc about the said one point and an hydraulic control system operable to control the flow of hydraulic fluid from the main pressure manifold to the hydraulically operable means.

4. A hydraulic system for a ground traversing vehicle comprising at least one source of hydraulic pressure delivering hydraulic fluid to a main pressure manifold, the vehicle having a first front chassis section and second rear chassis section pivoted together at a center joint for limited relative rotation in a horizontal plane about a vertical axis and for limited relative rotation about a longitudinally aligned horizontal axis but restrained against relative rotation about a transverse horizontal axis, two ground engaging wheels carried by each chassis section and mounted for rotation at opposite ends of axes transverse to the longitudinally aligned horizontal axis to maintain the vehicle upon the ground to be traversed, a prime mover associated with each wheel, means to transmit torque from the prime mover to its associated wheel, means to transmit power from the prime mover to an hydraulic pump delivering hydraulic fluid under pressure to a main hydraulic pressure manifold, means to selectively fix one of at least two points each associated with a wheel and on opposite sides of at least one chassis section relative to the ground to be traversed, said means comprising an hydraulically operable element receiving hydraulic fluid from said main pressure manifold, said element having a ground engaging portion which is vertically movable into and out of engagement with the ground through the axis of the adjacent wheel carried by the chassis section, hydraulically operable means supplied with hydraulic fluid from the main pressure manifold to articulate the vehicle about its center joint for the other of said points to move in an arc about the said one point and an hydraulic control system operable to control the flow of hydraulic fluid from the main pressure manifold to the hydraulically operable means, first selector valve means in the hydraulic system by means of which the hydraulic system may be selected to be operable in association with either the first front chassis section or the second rear chassis section, second selector means to place the hydraulic system under either manual or automatic control, sequencing valve means operable when the vehicle is under automatic control to sequentially interrupt one function and initiate another in accordance with a predetermined pattern.

References Cited
UNITED STATES PATENTS

| | | | |
|---|---|---|---|
| 2,598,863 | 6/1952 | Tucker | 180—79.4 X |
| 2,800,968 | 7/1957 | Joy | 180—8 |
| 2,800,970 | 7/1957 | Barrett | 180—8 |
| 3,057,319 | 10/1962 | Wagner | 180—9.32 X |

FOREIGN PATENTS 646,351　11/1950　Great Britain.

LEO FRIAGLIA, *Primary Examiner.*